United States Patent Office 3,459,598
Patented Aug. 5, 1969

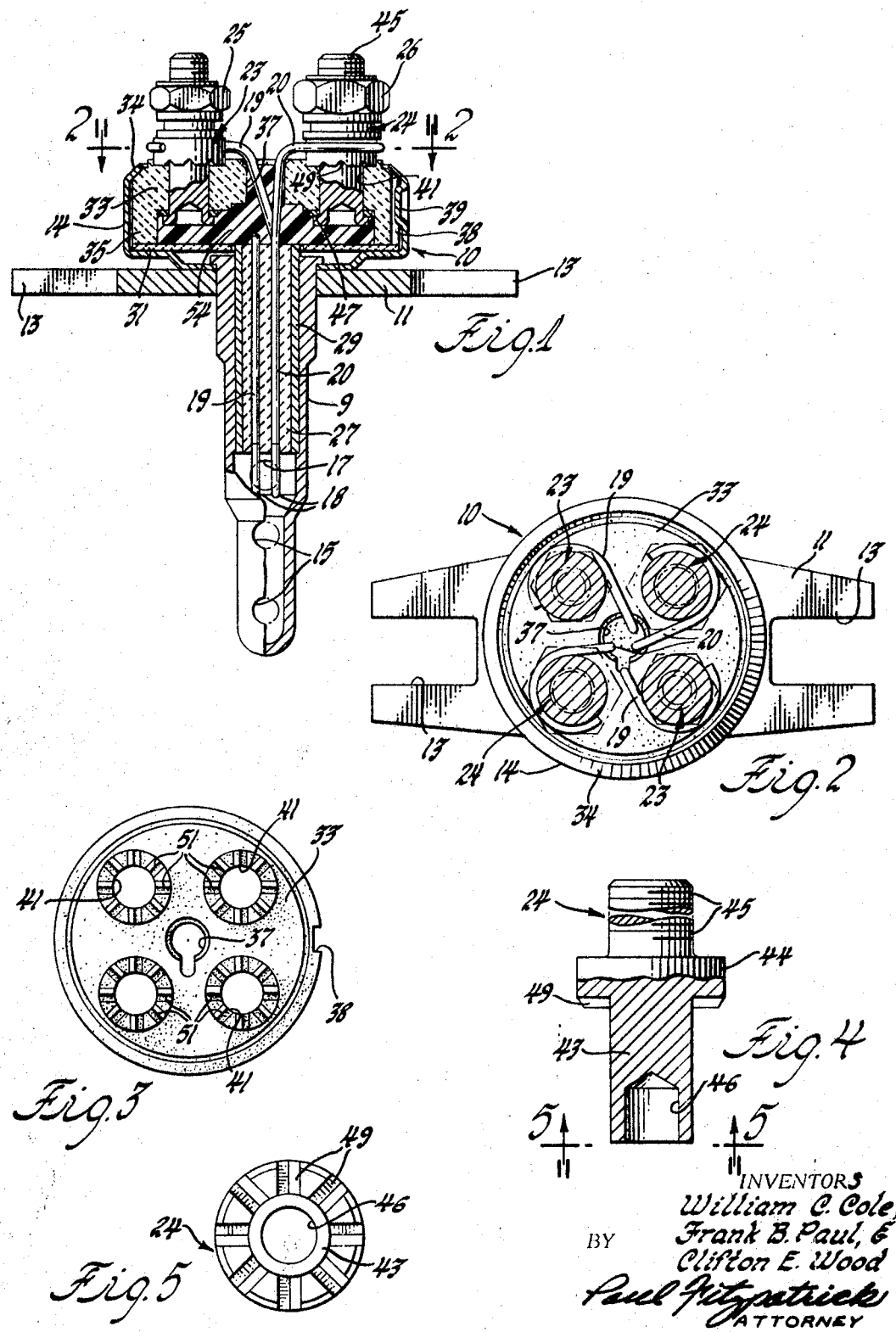

3,459,598
THERMOCOUPLE HEAD
William C. Coie, Auburn, N.Y., and Frank B. Paul, Flint, and Clifton E. Wood, Fenton, Mich., assignors to General Motors Corporation, Detroit, Mich., a corporation of Delaware
Filed Mar. 29, 1965, Ser. No. 443,489
Int. Cl. H01v 1/04
U.S. Cl. 136—231　　　　　　　　　　　　　　　4 Claims

ABSTRACT OF THE DISCLOSURE

Improvements in the terminal arrangements of thermocouples. The external terminals are mounted on a rigid mounting block of refractory insulating material with a flange on the terminal and the mounting block having splines which lock the terminal against rotation when the nuts for external wiring are torqued. The leads from the thermocouples are wrapped partly around the respective terminals and welded to them.

---

Our invention relates to improvements in electrical wiring and terminals therefor and particularly to a thermocouple head having improved structure for connection of the external wiring to the thermocouple.

Thermocouples used to measure temperatures in gas turbines, for example, customarily have external terminals of a stud and nut type by which the leads from the temperature-responsive couples are connected to the wiring harness of the engine. Our invention is directed to a simplified structure of this part of the thermocouple which is stronger, is cheaper to manufacture, and has improved electrical resistance characteristics. The nature of the invention and the advantages thereof will be apparent to those skilled in the art from the succeeding detailed description of the preferred embodiment of the invention and the accompanying drawings, in which:

FIGURE 1 is an elevation view, partly in section, of a thermocouple.

FIGURE 2 is a transverse section of the same taken on the plane indicated by the line 2—2 in FIGURE 1.

FIGURE 3 is a plan view of the terminal mounting block.

FIGURE 4 is a view, partly in section, of a terminal stud.

FIGURE 5 is a view of the same taken on the line 5—5 in FIGURE 4.

The drawings, and particularly FIGURE 1, disclose a thermocouple which, apart from our improved terminal arrangement, may be regarded as of known type. It is essentially the same as the thermocouple of Rademacher U.S. Patent No. 2,888,508. The thermocouple comprises a tubular probe 9 adapted to extend into a gas duct and a head 10 which is disposed outside the duct and provides for connection of the external wiring. The device also includes a flange 11 having slots 13 for mounting studs (not shown) by which it is held in position on the gas duct.

The head comprises a shell 14 which may be brazed or welded to the flange 11 and tubular probe 9. The thermocouple is of a sampling type with two gas inlets 15 and a gas outlet 17 in the probe. It is of a dual type in which two independent couples are provided with separate external connections. These couples include junctions indicated at 18 disposed between the gas inlets and outlet. A lead 19 of one metal and a lead 20 of another metal are fused together at each junction 18, and these leads extend to terminals 23 for the leads 19 and 24 for the leads 20. These terminals are similar but are of different metals, being made of the same metals as the leads to which they connect. The threaded portions which receive the external wiring and nuts 25 and 26 are of different diameters to prevent reverse connection of the external wires. The leads 19 and 20 are mounted in high temperature insulating material 27 within a metal sleeve 29. This assembly may be fixed to the probe by brazing the sleeve 29 within the probe 9 with the insulating material and sleeve terminating just above the outer end of the probe.

The shell 14 is a formed sheet metal cup. The somewhat yielding annular insulating disk 31 which may be, for example, of mica is disposed around the upper end of sleeve 29, covering the bottom of the shell 14. A rigid mounting block 33 of refractory insulating material, which is shown most clearly in FIGURES 1 and 3, is mounted in the shell 14 and is retained by crimping the upper margin of the shell at 34. The block 33 is of generally circular outline with a depending flange 35 which bears against the insulator 31. A keyhole shaped center opening 37 provides for passage of the lead through the block. A notch 38 in the margin cooperates with an indentation 39 in the shell to fix the angular position of the block.

Four holes 41 in the block receive the shanks 43 of the terminals. Each terminal comprises the shank, a flange 44, and a threaded portion 45 to receive the terminal nut 25 or 26. The shank is drilled axially at 46 to provide a thin-walled end which, as shown in FIGURE 1, is spun out over a yieldable washer 47 to fix the terminal to the insulating block 33. The face of flange 44 which engages the insulating block is formed with eight radiating V-grooves 49, and the block is molded to provide eight complementary radiating ridges or teeth 51 around each hole 41. Thus, there is a radial spline connection involving the grooves 49 and teeth 51 between each terminal and the block so that, when the terminal is pulled down against the face of the block, it is held rigidly and non-rotatably in the block.

This quick, easy and rigid mounting of the terminals on the insulating block greatly facilitates manufacture of the terminal block assembly. Also, it makes possible a convenient and superior means of connecting the leads 19 and 20 to the terminals 23 and 24. As shown most clearly in FIGURE 2, the leads which extend through the hole 37 are wrapped approximately half-way around the terminals and are held to the terminals by fused metal; that is, the lead and terminal are fusion bonded by fused metal to each other. Preferably, the leads are resistance welded to the terminals in the position illustrated. The connection of the lead to the terminal is both secure and visible. Since the terminal cannot turn, the connection is not subject to mechanical stresses.

After the insulating block with the terminal studs is mounted inside the shell and the shell is crimped to retain it, the void defined by the hole 37 and the space within flange 35 is filled with a plastic insulating material 54, which material is solidified by heat or otherwise.

It will be apparent from the foregoing that the thermocouple and particularly the terminal assembly is a very easily manufactured, strong, and suitable structure. It should also be apparent that the terminal structure in general and the means by which it is mounted minimize problems of insulating the terminals and the possibility of grounds or shorts.

The detailed description of the preferred embodiment of the invention for the purpose of explaining the principles thereof is not to be considered as limiting or restricting the invention, as many modifications may be made by the exercise of skill in the art.

We claim:
1. A thermocouple comprising, in combination, a probe, a head fixed to the probe, at least one junction in the probe, leads extending from the junction into the head, a rigid insulating block on the head, terminals for connection of external wiring mounted on and extending out from the block and connected to the said leads, in which:
- a terminal is fixed to the block by means including mating radial splines on the terminal and the block positively restraining the terminal against rotation and
- the leads are brought through the block, wrapped partially around the terminals, and held thereto by fusion bonded metal.

2. A thermocouple comprising, in combination, a probe, a head fixed to the probe, at least one junction in the probe, leads extending from the junction into the head, a rigid insulating block on the head, terminals for connection of external wiring mounted on and extending out from the block and connected to the said leads, in which:
- a terminal includes a flange engaging a face of the block;
- the terminal is fixed to the block by means including mating radial splines on the flange and the block positively restraining the terminal against rotation; and
- the terminal includes an expanded shoulder on the opposite face of the block.

3. A thermocouple comprising, in combination, a probe, a head fixed to the probe, at least one junction in the probe, leads extending from the junction into the head, a rigid insulating block on the head, terminals for connection of external wiring mounted on and extending out from the block and connected to the said leads, in which:
- the leads are brought through the block, wrapped partially around the perimeter of the respective terminals, and held thereto by fusion bonded metal.

4. A terminal block assembly comprising, in combination,
- a rigid insulating block;
- terminals for connection of external wiring mounted on and extending out from the block;
- the block having a hole extending through it;
- terminals fixed to the block by means including mating radial splines on the terminals and the block positively restraining the terminals against rotation; and
- leads brought through the hole in the block, wrapped partially around the terminals, and held thereto by fusion bonded metal.

References Cited

UNITED STATES PATENTS

| | | | |
|---|---|---|---|
| 2,059,480 | 11/1936 | Obermaier | 136—232 |
| 2,653,983 | 9/1953 | Best | 136—231 |
| 2,736,784 | 2/1956 | Gore | 136—233 X |
| 1,912,653 | 6/1933 | Olson | 339—220 X |
| 2,483,350 | 9/1949 | Polye et al. | 136—233 |
| 2,812,381 | 11/1957 | May | 174—153 |
| 2,992,402 | 7/1961 | Thomas | 136—230 X |
| 3,091,656 | 5/1963 | Lamoureaux | 339—220 X |
| 3,085,125 | 4/1963 | Hill | 136—231 X |
| 3,202,755 | 8/1965 | Oswald | 339—220 X |

WINSTON A. DOUGLAS, Primary Examiner

M. J. ANDREWS, Assistant Examiner